US012563055B2

(12) United States Patent
Hong et al.

(10) Patent No.: US 12,563,055 B2
(45) Date of Patent: Feb. 24, 2026

(54) EVENT CORRELATION DETERMINATION IN EXTENDED DETECTION AND RESPONSE SYSTEMS

(71) Applicant: Cisco Technology, Inc., San Jose, CA (US)

(72) Inventors: Yi Hong, Foster City, CA (US); Tian Bu, Basking Ridge, NJ (US); Girish P Chandranmenon, Edison, NJ (US)

(73) Assignee: Cisco Technology, Inc., San Jose, CA (US)

( * ) Notice: Subject to any disclaimer, the term of this patent is extended or adjusted under 35 U.S.C. 154(b) by 8 days.

(21) Appl. No.: 18/410,926

(22) Filed: Jan. 11, 2024

(65) Prior Publication Data

US 2025/0233870 A1     Jul. 17, 2025

(51) Int. Cl.
H04L 9/40        (2022.01)

(52) U.S. Cl.
CPC ...... H04L 63/1416 (2013.01); H04L 63/1425 (2013.01)

(58) Field of Classification Search
USPC ......................................................... 726/23
See application file for complete search history.

(56) References Cited

U.S. PATENT DOCUMENTS

| | | | |
|---|---|---|---|
| 9,888,024 B2 * | 2/2018 | Roundy | ................. G06F 21/552 |
| 12,328,325 B1 * | 6/2025 | Mukasa | .............. H04L 63/1425 |

| | | |
|---|---|---|
| 2021/0037024 A1 | 2/2021 | Brown |
| 2021/0279117 A1 | 9/2021 | Lehmann |
| 2022/0103589 A1 | 3/2022 | Shen |
| 2022/0224721 A1 | 7/2022 | Bertiger |
| 2022/0400135 A1 | 12/2022 | Gamra |

(Continued)

FOREIGN PATENT DOCUMENTS

| | | | | |
|---|---|---|---|---|
| CN | 104899241 A | * | 9/2015 | ......... G06F 16/3334 |
| CN | 118802230 A | * | 10/2024 | ......... H04L 63/1433 |

(Continued)

OTHER PUBLICATIONS

International Search Report and Written Opinion for International Application No. PCT/US2025/010161, mailed Apr. 28, 2025, 14 Pages.

*Primary Examiner* — Sakinah White Taylor
(74) *Attorney, Agent, or Firm* — Lee & Hayes, P.C.

(57) ABSTRACT

This disclosure describes techniques for evaluating a correlation between two monitoring events based on a regularized co-occurrence occurrence measure associated with the two monitoring events. For example, in some cases, the techniques described herein include determining a co-occurrence measure associated with two monitoring events by regularizing an initial co-occurrence measure based on the respective occurrence measures associated with the two monitoring events. In some cases, an example system: (i) determines a first occurrence measure associated with a first event and a second occurrence measure associated with a second event, (ii) determines a co-occurrence measure associated with the two events, (iii) determines a regularization parameter based on the first and second occurrence measures as well as the co-occurrence measure, and (iv) determines a regularized co-occurrence measure based on the co-occurrence measure and the regularization parameter.

19 Claims, 6 Drawing Sheets

(56) References Cited

U.S. PATENT DOCUMENTS

| | | |
|---|---|---|
| 2023/0275907 A1 | 8/2023 | Bertiger et al. |
| 2023/0289355 A1 * | 9/2023 | Sandu |
| 2024/0073055 A1 * | 2/2024 | Park .................... H04L 12/2832 |
| 2025/0039242 A1 * | 1/2025 | Desai ................. H04L 63/1416 |

FOREIGN PATENT DOCUMENTS

| | | | |
|---|---|---|---|
| WO | WO-2015006349 A1 * | 1/2015 | .......... H04L 61/4511 |
| WO | 2023192215 A1 | 10/2023 | |

* cited by examiner

Figure 3:
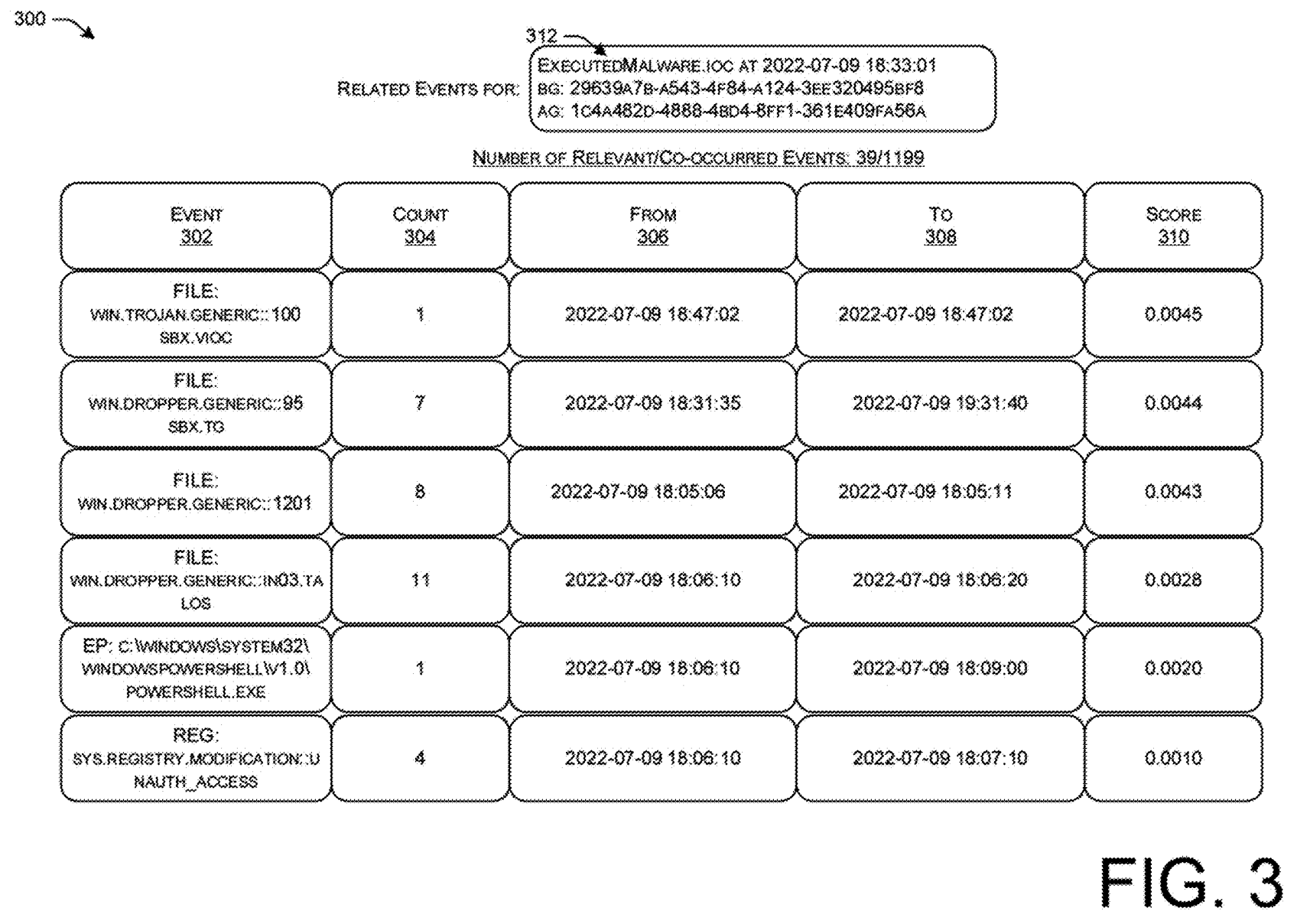

300

RELATED EVENTS FOR:
312 → EXECUTEDMALWARE.IOC AT 2022-07-09 18:33:01
BG: 29533A78-A543-4F84-A124-3EE320495BF8
AG: 1C4A482D-4888-48D4-8FF1-361E409FA56A

NUMBER OF RELEVANT/CO-OCCURRED EVENTS: 39/1199

| EVENT 302 | COUNT 304 | FROM 306 | TO 308 | SCORE 310 |
|---|---|---|---|---|
| FILE: WIN.TROJAN.GENERIC::100 SBX.VIOC | 1 | 2022-07-09 18:47:02 | 2022-07-09 18:47:02 | 0.0045 |
| FILE: WIN.DROPPER.GENERIC::85 SBX.TG | 7 | 2022-07-09 18:31:35 | 2022-07-09 19:31:40 | 0.0044 |
| FILE: WIN.DROPPER.GENERIC::1201 | 8 | 2022-07-09 18:05:06 | 2022-07-09 18:05:11 | 0.0043 |
| FILE: WIN.DROPPER.GENERIC::RN03.TA LOS | 11 | 2022-07-09 18:06:10 | 2022-07-09 18:06:20 | 0.0028 |
| EP: C:\WINDOWS\SYSTEM32\ WINDOWSPOWERSHELL\V1.0\ POWERSHELL.EXE | 1 | 2022-07-09 18:06:10 | 2022-07-09 18:09:00 | 0.0020 |
| REG: SYS.REGISTRY.MODIFICATION::U NAUTH_ACCESS | 4 | 2022-07-09 18:06:10 | 2022-07-09 18:07:10 | 0.0010 |

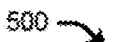
500
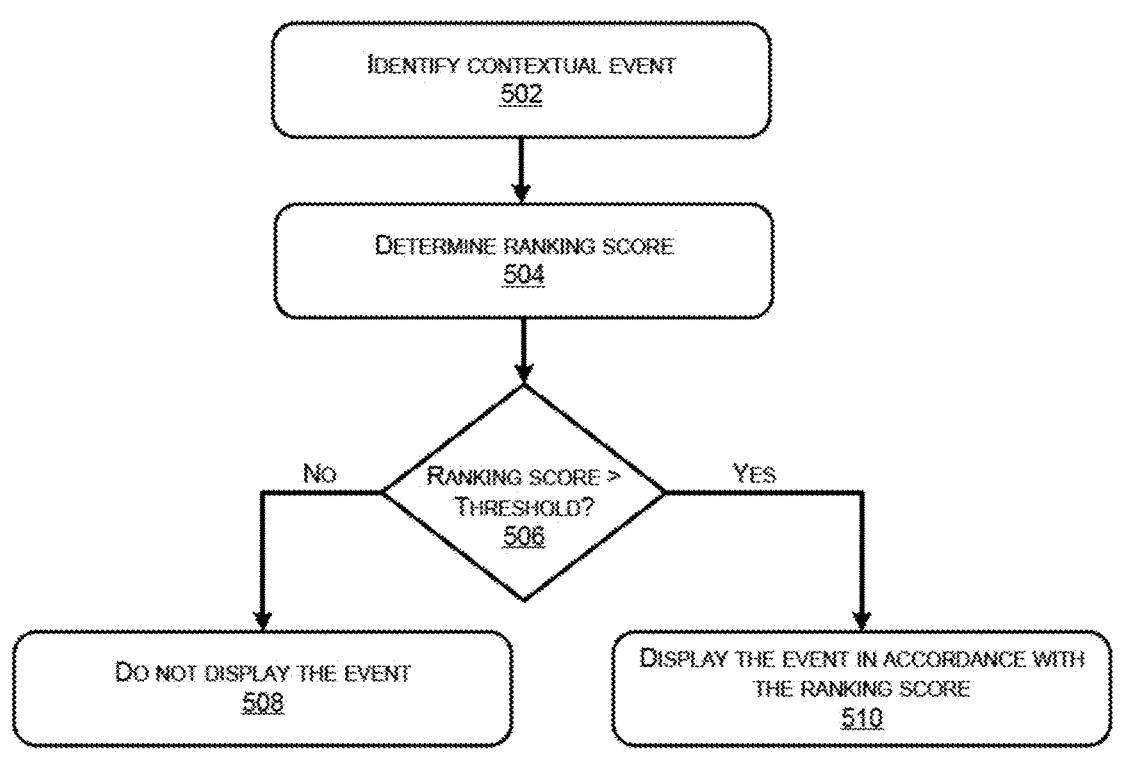
IDENTIFY CONTEXTUAL EVENT
502
DETERMINE RANKING SCORE
504
RANKING SCORE >
THRESHOLD?
506
NO
YES
DO NOT DISPLAY THE EVENT
508
DISPLAY THE EVENT IN ACCORDANCE WITH
THE RANKING SCORE
510
FIG. 5

EVENT CORRELATION DETERMINATION IN EXTENDED DETECTION AND RESPONSE SYSTEMS

TECHNICAL FIELD

This present application pertains to the field of computer security and more specifically, to techniques for event correlation determination in extended detection and response systems.

BACKGROUND

Extended detection and response (XDR) systems are an emerging technology for advanced threat detection and security incident response. XDR platforms integrate data from the entire information technology infrastructure of a computing system to provide unified visibility and automated actions against cyberattacks. A core challenge in XDR systems is correlating security events and identifying common patterns of event monitoring across the various monitoring event sets received from different event monitoring tools.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 provides an operational example of an administrator platform that depicts a ranked list of monitoring events associated with a selected monitoring event.

FIG. 5 is a flowchart diagram of an example process for conditionally displaying a contextual monitoring event in relation to a selected monitoring event.

DESCRIPTION OF EXAMPLE EMBODIMENTS

Overview

Figure 1:
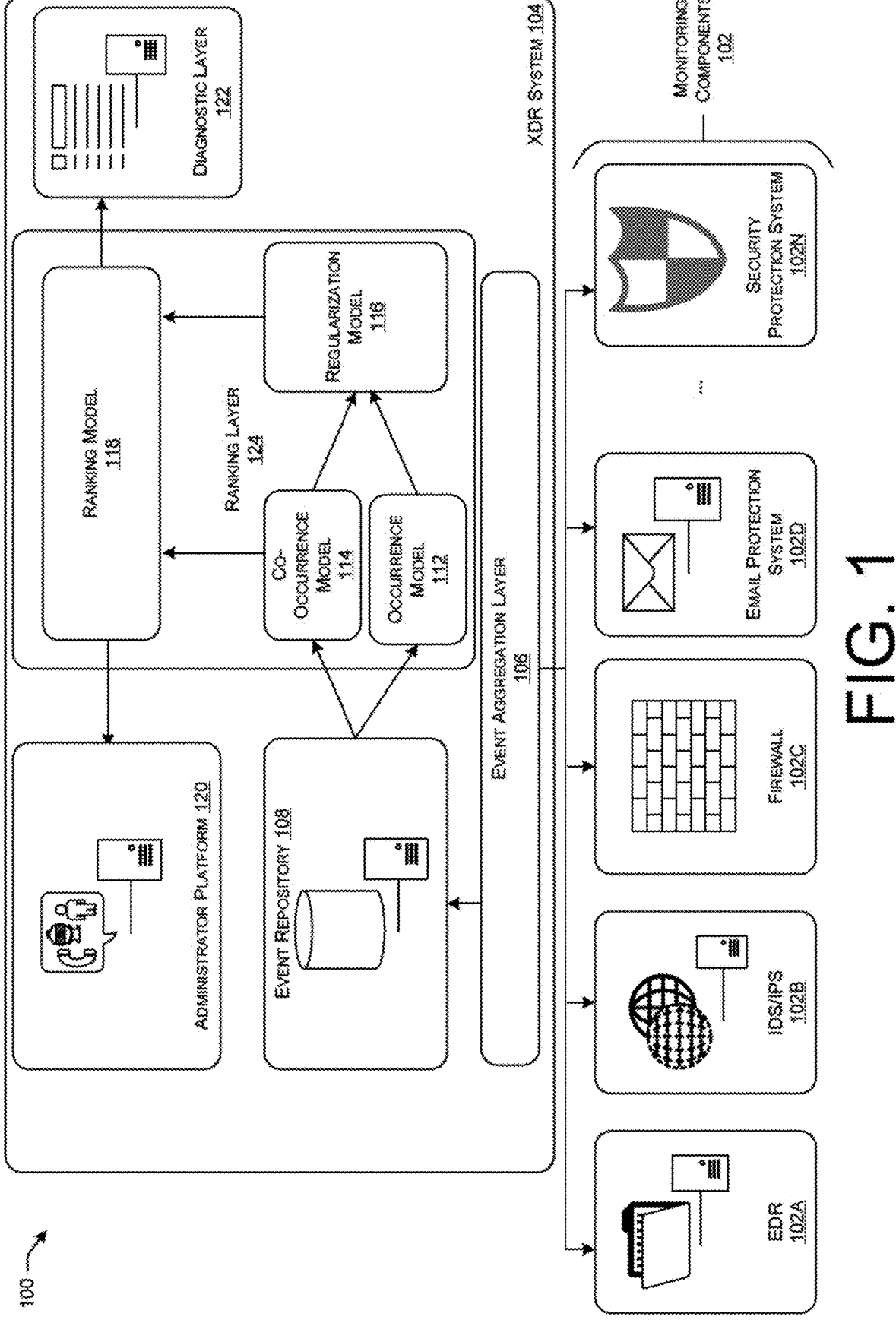
FIG. 1 depicts an example environment with an Extended Detection and Response (XDR) system that interacts with a set of monitoring components.

This disclosure describes techniques for evaluating a correlation between two monitoring events based on a regularized co-occurrence occurrence measure associated with the two monitoring events. In some cases, the techniques described herein relate to a method including receiving a first monitoring event associated with a security incident recorded in relation to a computer system, wherein the first monitoring event is associated with a first event category and a first feature value corresponding to a first feature type. The method may further comprise receiving a second monitoring event associated with the computer system, wherein the second monitoring event is associated with a second event category and a second feature value corresponding to a second feature type. The method may further comprise determining first data representing that the first event category is indexed based at least in part on the first feature type on an event repository. The method may further comprise determining second data representing that the second event category is indexed based at least in part on the second feature type on the event repository. The method may further comprise determining, based on the first data, a first identifier associated with the first monitoring event based on the first feature value. The method may further comprise determining, based on the second data, a second identifier associated with the first monitoring event based on the second feature value. The method may further comprise querying the event repository based on the first identifier and a third identifier associated with the first event category to determine a first query output. The method may further comprise determining, based on the first query output, a first occurrence measure associated with the first monitoring event. The method may further comprise querying the event repository based on the second identifier and a fourth identifier associated with the second event category to determine a second query output. The method may further comprise determining, based on the second query output, a second occurrence measure associated with the second monitoring event. The method may further comprise determining a co-occurrence measure associated with the first monitoring event and the second monitoring event. The method may further comprise determining a ranking score associated with the second monitoring event based on the first occurrence measure, the second occurrence measure, and the co-occurrence measure. The method may further comprise, based on determining the ranking score satisfies a threshold, causing a representation of the second monitoring event to be displayed using a system administrator platform associated with the computer system.

Additionally, the techniques described herein may be performed by a system and/or device having non-transitory computer-readable media storing computer-executable instructions that, when executed by one or more processors, performs the method described above.

Example Embodiments

This disclosure describes techniques for evaluating a correlation between two monitoring events based on a regularized co-occurrence occurrence measure associated with the two monitoring events. For example, in some cases, the techniques described herein include determining a co-occurrence measure associated with two monitoring events by regularizing an initial co-occurrence measure based on the respective occurrence measures associated with the two monitoring events. In some cases, an example system: (i) determines a first occurrence measure associated with a first event and a second occurrence measure associated with a second event, (ii) determines a co-occurrence measure associated with the two events, (iii) determines a regularization parameter based on the first and second occurrence measures as well as the co-occurrence measure, and (iv) determines a regularized co-occurrence measure based on the co-occurrence measure and the regularization parameter. The objective behind this regularization may be to account for the underlying base occurrence rates of the individual events when assessing the significance of their co-occurrence. In some cases, the regularization may adjust the raw co-occurrence rate between two event types by their expected co-occurrence assuming independence.

For example, very common events may co-occur frequently even if fundamentally unrelated. However, a high co-occurrence of two rarely occurring events may be more statistically significant as an indicator of a relationship between the events. By regularizing the co-occurrence measures, the significance of such measures may be quantified after normalizing for the prevalence of the individual events. This regularization may prevent misleading associations being detected between events simply because one or both of the events happen very often. This regularization may also avoid missing important event relationships masked by the dominant presence of high-volume security events.

In some cases, historical monitoring events may be indexed based on their event categories and/or event identifiers determined based on their event categories. For example, a file-related monitoring event may be indexed as a file-related event and based on a set of values used for indexing file-related events. This method of indexing may substantially decrease the computational complexity associated with retrieval of monitoring events for the purposes of computing occurrence and/or co-occurrence measures. Specifically, rather than scanning across all stored events in an event repository, only those event sharing the same category and associated indexing keys may need to be examined. This may transform queries needed to determine occurrence and/or co-occurrence measures into targeted queries, thus decreasing the computational complexity of determining occurrence and/or co-occurrence measures.

In some cases, the regularized co-occurrence measure determined for two monitoring events may be used to determine whether and/or how to display one of the two monitoring events in relation to selection of the other of the two monitoring events. For example, in some cases, after selection of a monitoring event, those monitoring events that: (i) have occurred within a threshold time period before and/or after the selected event and (ii) have a regularized co-occurrence measure that exceeds a threshold may be displayed. In some cases, the displayed monitoring events may be ranked based on their respective regularized co-occurrence measures.

In some cases, the techniques described herein improve operational efficiency and/or accuracy of an extended detection and response (XDR) system by selecting and/or displaying related events based on regularized co-occurrence measures. As described above, this regularization may prevent misleading associations being detected between events simply because one or both of the events happen very often. Moreover, the regularization may also avoid missing important event relationships masked by the dominant presence of high-volume security events. Accordingly, the techniques described herein may improve operational efficiency and/or accuracy of an XDR system.

In some cases, the techniques described herein reduce the operational load on an XDR system by reducing the number of queries for related monitoring events. In some cases, by providing more informative lists and/or rankings of relevant monitoring events, the techniques described herein reduce the likelihood that users may provide multiple queries and/or queries with complicated conditions for receiving related monitoring events. Accordingly, by providing more informative lists and/or rankings of relevant monitoring events, the techniques described herein reduce the operational load on an XDR system.

FIG. 1 depicts an environment 100 with an Extended Detection and Response (XDR) system 104 that interacts with a set of monitoring components 102, such as an EDR system 102A, an Intrusion Detection System (IDS)/Intrusion Prevention System (IPS) 102B, a firewall engine 102C, an email protection system 102D, and other security protection systems 102N.

The EDR system 102A may monitor activity on endpoints such as servers, desktops, and laptops. The EDR system 102A may generate monitoring events for suspicious or malicious activity observed on endpoints. The EDR system 102A may be implemented as agent software installed on each endpoint. The agent may operate in the background, continuously collecting endpoint telemetry data and sending it to a central management console and/or the XDR system 104. The EDR agent may employ various techniques to detect threats, such as signature-based detection, behavioral analysis, and machine learning algorithms. Signature-based detection may include comparing observed activities against known patterns of malicious behavior or attack signatures. Behavioral analysis may identify anomalies and/or deviations from normal endpoint behavior which might indicate a potential threat. Machine learning algorithms may enhance detection capabilities by learning from historical data and adapting to new and emerging threats.

The IDS/IPS 102B may monitor network activity by analyzing network traffic. The IDS/IPS 102B may generate monitoring events for anomalous network traffic or known attack patterns. To achieve its monitoring and detection capabilities, the IDS/IPS 102B may use a combination of techniques, including signature-based detection, anomaly detection, and heuristic analysis. Signature-based detection involves comparing network traffic against a database of known attack signatures or patterns. Anomaly detection focuses on identifying deviations from normal network behavior, which could indicate possible intrusions or suspicious activities. Heuristic analysis involves applying predefined rules and behavioral models to detect unknown or emerging threats. In some cases, the IDS/IPS 102B performs at least one of an IDS or an IPS functionality. The IDS functionality may identify suspicious or anomalous network behaviors, such as port scans, unusual data transfer patterns, or unauthorized access attempts. The IPS functionality may take immediate action to block or prevent identified threats from progressing further into the network.

The IDS/IPS 102B may be implemented as a hardware or virtual network appliance deployed on the network. For example, the IDS/IPS 102B can be realized as a hardware appliance installed at strategic points within the network infrastructure. Alternatively, the IDS/IPS 102B may be deployed as a virtual network appliance running on virtualized servers or cloud-based instances.

The firewall engine 102C may filter incoming and outgoing network traffic according to configured rules. The firewall engine 102C may generate monitoring events when traffic is blocked or allowed. In some cases, the firewall engine 102C operates as a barrier between the internal network and the external world, controlling the flow of network traffic based on predefined rules. In some cases, the firewall engine 102C is configured to filter incoming and outgoing network traffic to enforce security policies and protect the organization's assets from unauthorized access, data exfiltration, and potential threats.

In some cases, when network packets arrive at the firewall, they are inspected against a set of configured rules and policies. These rules can be based on various criteria, such as source and destination IP addresses, port numbers, application protocols, or specific content within the packets. If a packet matches an allow rule, the firewall engine 102C permits it to pass through to its intended destination. On the other hand, if the packet matches a deny rule, the firewall engine blocks it, preventing unauthorized access or potentially malicious traffic from entering or leaving the network.

The firewall engine 102C may be implemented as a hardware or virtual network appliance. Hardware-based solutions may offer dedicated processing power for packet inspection, making them suitable for high-performance network environments where low latency is crucial. Virtual network appliances, running on virtualized servers or cloud instances, may provide flexibility and ease of management, making them ideal for dynamic and rapidly changing network infrastructures.

The email protection system 102D may scan incoming and outgoing emails for malware and spam. The email protection system 102D may generate monitoring events for blocked or allowed emails. The email protection system 102D may be implemented as a software service integrated with email servers. In some cases, the email protection system 102D continually evaluates the content, attachments, and/or sender reputation of incoming emails. To do so, the email protection system 102D may use databases of known threat signatures to identify and block emails that exhibit malicious behavior or contain harmful content. In some cases, the email protection system 102D scrutinizes outgoing emails to ensure that they do not inadvertently transmit sensitive information or include suspicious links or attachments. In some cases, whenever the email protection system 102D identifies a potentially malicious or spam email, the email protection system 102D generates monitoring events to record the incident. These monitoring events can include details such as the sender's information, recipient details, timestamp, and/or a description of the threat or spam category.

Additional security protection systems 102N may perform other types of security monitoring and generate associated monitoring events. Examples of such additional security protection systems 102N include Web Application Firewalls (WAFs), Data Loss Prevention (DLP) systems, Network Access Control (NAC) systems, threat intelligence platforms, advanced threat detection systems, Security Information and Event Management (SIEM) systems, vulnerability management systems, and Endpoint Protection Platforms (EPPs). The additional security protection systems 102N may generate monitoring events that contribute to a comprehensive security posture to enable organizations to detect and respond to cyber threats. In some cases, integration of the additional security protection systems 102N with the XDR system 104 and other security components allows for centralized management, correlation of security data, and streamlined incident response efforts.

As depicted in FIG. 1, an event aggregation layer 106 receives the monitoring events generated by the monitoring components 102 and stores those events on an event repository 108. The event repository 108 may operate as a central hub for collecting, storing, and analyzing the monitoring events generated by the various monitoring components 102. The event repository 108 may receive the monitoring events in real-time from the monitoring components 102, storing them in a structured or semi-structured format for efficient retrieval and analysis. The event repository 108 may be implemented using a database, data warehouse, and/or cloud storage. If implemented as a database, the event repository 108 might utilize NoSQL databases like Apache Cassandra or MongoDB, providing horizontal scaling capabilities to handle large volumes of data. A data warehouse approach might use solutions like Amazon Redshift or Google BigQuery to enable complex analytics and reporting on historical data. Alternatively, cloud-based object storage services like Amazon S3 or Microsoft Azure Blob Storage might be utilized.

As further depicted in FIG. 1, the XDR system 104 includes an event aggregation layer 106 that is configured to collect monitoring events generated by the monitoring components 102. The event aggregation layer 106 may, for example, receive the monitoring events in real-time from the monitoring components 102, transform the monitoring events into a unified format, and/or store the monitoring events and/or reformatted monitoring events in the event repository 108. The event aggregation layer 106 may, for example, store data determined based on the monitoring events using a structured and/or a semi-structured format.

The event repository 108 may, in some cases, be configured to receive and store the monitoring events generated by the monitoring components 102. The event repository 108 may operate as a central hub for collecting, storing, and/or analyzing the monitoring events generated by the various monitoring components 102. The event repository 108 may receive the monitoring events in real-time from the event aggregation layer 106. The event repository 108 may be implemented using a database, data warehouse, and/or cloud storage. If implemented as a database, the event repository 108 may be implemented using a structured query language (SQL) database management system (DMBS) or a non-structured query language (NoSQL) DBMS like Apache Cassandra and/or MongoDB. If implemented as a data warehouse, the event repository 108 may be implemented using a data warehousing solutions like Amazon Redshift or Google BigQuery. If implemented as a cloud storage framework, the event repository 108 may be implemented using cloud-based object storage services like Amazon S3 or Microsoft Azure Blob Storage.

In some cases, a monitoring event is associated with an event category that represents at least one of: a feature (e.g., a type of) a monitoring component that captured an incident related to the monitoring event, a feature (e.g., a type of) a device that was affected by an incident reported by the monitoring event, a feature (e.g., a type) of a software system and/or software component that was affected by an incident reported by the monitoring event, or a feature (e.g., a type of) security incident related to the monitoring event. Examples of event categories include: an endpoint category reported by an endpoint monitoring component, an indicator of compromise (IOC) category related to cybersecurity breaches, a Suspicious Process Prevention (SPP) category related to malicious (e.g., malware) activity detections, a file category related to monitoring events affecting files, and/or the like.

In some cases, each event category is indexed using a different set of features on the event repository 108. In some cases, a first event associated with a first event category may be indexed using a first set of feature values corresponding to a first set of features, while a second event associated with a second event category may be indexed using a second set of feature values corresponding to a second set of features. For example, a monitoring event associated with a file category may be indexed by a combination of a feature value representing an operating system associated with an affected file, a feature value representing a type of detected file activity (e.g., a type of malware activity detected in relation to the file, such as a Trojan activity detected in relation to the file), a feature value representing whether the detected file activity (e.g., the detected Trojan activity) matches a known variant of detected file activities or is generic, a feature value representing a version number of the detected file activity, a feature value representing a type of an environment within which the file activity was detected (e.g., whether the activity was detected with a sandboxed environment), and/or the like. As another example, a monitoring event associated with an endpoint category may be associated with an identifier (e.g., a URL) of an endpoint software agent (e.g., Powershell) used to execute an action associated with the monitoring event.

Accordingly, in some cases, to store a monitoring event on the event repository 108, the event aggregation layer 106: (i) determines the event category associated with the monitoring event, (ii) determines which feature(s) are used to index events associated with the determined event category, (iii) determines an event identifier for the event based on the feature values of the event that corresponding to the determined indexing feature(s), and (iv) stores data associated with the monitoring event in association with the event identifier. In some cases, the event aggregation layer 106 stores a monitoring event in association with the event identifier and an identifier of the event's category. For example, a monitoring event associated with a file event category may be stored in association with: (i) an event identifier generated based on a combination of a feature value representing an operating system associated with an affected file, a feature value representing a type of detected file activity (e.g., a type of malware activity detected in relation to the file, such as a Trojan activity detected in relation to the file), a feature value representing whether the detected file activity (e.g., the detected Trojan activity) matches a known variant of detected file activities or is generic, a feature value representing a version number of the detected file activity, a feature value representing a type of an environment within which the file activity was detected (e.g., whether the activity was detected with a sandboxed environment), and/or the like, and (ii) an identifier of the file event category. An example of an indexing value for a monitoring event associated with a file category may be File:win:trojan:generic:::1000.sbx.vioc.

In some cases, each monitoring event stored in the event repository 108 is associated with an event identifier (e.g., an event key), where the event identifier may include one or more feature values associated with a corresponding monitoring event that uniquely identify an event category of the monitoring event and/or a device affected by the monitoring event. For example, a monitoring event may be associated with an event identifier that includes one or more of an identifier of a monitoring component that captured the event, an identifier of the device in relation to which the event was captured, a type and/or category of the event, an email address affected by the event, and/or the like. In some cases, an identifier of a monitoring event includes one or more device identifiers for a device that was affected by the monitoring event.

In some cases, each monitoring component 62 provides monitoring events that identify devices using a set of device identifiers, such as a set of device identifiers that are local to that monitoring component. These device identifiers may be distinct from the device identifiers used by other monitoring components. For example, the EDR system 62A may identify a device using an agent identifier assigned to the EDR agent software installed on that device, the username of the user logged into the device, the email address associated with the user account on the device, or other identifiers that are specific to the EDR system 62A. The IDS/IPS 62B may identify devices by their Internet Protocol (IP) address on the monitored network, Media Access Control (MAC) address, hostname, or other network-specific identifiers. The firewall engine 62C may identify devices by IP address, MAC address, or hostname if doing L2/L3 monitoring, or may identify devices by user if doing L7 application monitoring. The email protection system 62D may identify devices by the email address associated with the user account that is sending or receiving emails from that device.

Other monitoring components may use device identifiers like process name, database credentials, application usernames, or other identifiers specific to that monitoring domain. For example, WAFs may identify devices based on the session token or user account associated with web application interactions. As another example, DLP systems may identify devices based on user login credentials, file names, or file metadata. As yet another example, NAC systems may identify devices based on their MAC address or authenticated user credentials. As an additional example, advanced threat detection systems employ a combination of behavioral patterns, IP addresses, and user behavior to identify devices exhibiting suspicious activities.

Accordingly, different monitoring events generated by different monitoring components and/or associated with different event categories may be associated with different data formats for event identifiers. For example, an IDS/IPS may generate an event identifier for a network breach event that includes at least one of: a source IP address identifying the IP address of the source device from which the breach originated, a destination IP address identifying the IP address of the destination device being targeted, a port identifier identifying the source and destination ports associated with packets related to the network breach, a protocol identifier identifying the communication protocol associated with packets related to the network breach, or a threat classification identifier identifying the type of breach detected (e.g., a command injection breach, a query injection breach, a remote file inclusion breach, and/or the like).

As another example, a firewall system may generate an event identifier for an authorized access event that includes at least one of: a source IP address identifying the external IP address attempting to establish internal communication, a destination IP address identifying the internal IP address being targeted, a port identifier identifying the source and destination ports associated with packets related to the unauthorized access attempt, a protocol identifier identifying the communication protocol associated with packets related to the unauthorized access attempt, or a user identifier identifying the username and/or user credential associated with the unauthorized access attempt.

As another example, a firewall system for a web application may generate an event identifier for a malicious bot event that includes at least one of: a session identifier identifying the established session between the external device and the web application in which the malicious bot was detected, a user identifier identifying the username or user credentials associated with the session, a field identifying the specific uniform resource locator (URL) being accessed, an HTTP method identifier identifying the HTTP function (GET, POST, and/or the like) associated with the malicious request, or an attack vector identifier identifying the type of malicious bot attack detected based on one or more classification rules (based on scraping, credential stuffing, site scraping, and/or the like).

As another example, an antivirus system may generate an event identifier for a malware infection that includes at least one of: a detection name identifying the specific malware threat detected, a file name and/or file path identifying the infected file, a file hash providing a unique hash identifier of the infected file, an endpoint identifier identifying the host device on which the infected file was detected, or a detection classification identifying the type of malware threat (virus, spyware, ransomware, and/or the like).

As another example, a network access control system may generate an event identifier for an unauthorized device connection event that includes at least one of: a MAC address uniquely identifying the unauthorized device attempting network access, an IP address assigned to the unauthorized device, a switchport identifier identifying the physical switchport to which the unauthorized device connected, a posture status identifier identifying compromised host compliance status determined via asset scanning, or a protocol identifier identifying the communication protocol used by the unauthorized device.

As further depicted in FIG. 1, the XDR system 104 includes an occurrence model 112 that is configured to determine an occurrence measure for a monitoring event. The occurrence measure may represent a ratio of at least a subset of the events stored in the event repository 108 that share the same event identifier as a particular monitoring event. For example, the occurrence measure may represent a ratio of all of the events stored in the event repository 108 that share the same event identifier as a particular monitoring event. As another example, the occurrence measure may represent a ratio of a subset of the events stored in the event repository 108 that share the same event identifier as a particular monitoring event, where the subset may be determined to include a set of events associated with a specified time period (e.g., a set of events associated with a recent time period) and/or a set of events associated with a specified event category.

In some cases, to determine the occurrence measure for a first monitoring event, the occurrence model 112: (i) determines the event category associated with the first monitoring event, (ii) determines which feature(s) are used to index events associated with the determined event category, (iii) determines an event identifier for the event based on the feature values of the first monitoring event that corresponding to the determined indexing feature(s), and (iii) queries the event repository 108 to determine at least one of: (i) a count of monitoring events that have the same event identifier as the first monitoring event within some or all (e.g., a defined subset) of the events stored in the event repository, or (ii) a count of some or all (e.g., a defined subset) of the events stored in the event repository. The occurrence model 112 may then determine the occurrence measure by calculating a ratio of the count of monitoring events that have the same event identifier as the first monitoring event to the total count of events that were queried. For example, if 100 events out of 10,000 queried events have the same event identifier, the occurrence measure may be determined to be 1%.

In some cases, the occurrence model 112 may weigh the occurrence measure using time decay functions to account for the recency of the events used to calculate the occurrence. For example, more recent events may be weighted higher than older events. As another example, the occurrence model 112 may calculate a weighted average of the occurrence measure using exponentially decaying weights based on event timestamps. The occurrence measure may provide an indication of the prevalence of a particular event identifier compared to other events. A higher occurrence measure may indicate that the event is more common, while a lower occurrence measure may indicate a more anomalous event.

As further depicted in FIG. 1, the XDR system 104 includes a co-occurrence model 114 that is configured to determine a co-occurrence measure for two monitoring events. The co-occurrence measure for two monitoring events may represent a ratio of: (i) a count of times monitoring events that have the same event identifier as one of the two monitoring events occur within a threshold time period (e.g., a threshold temporal proximity) of the monitoring events that have the same event identifier as the other of the two monitoring events, and (ii) a count of times associated with occurrences of monitoring events that have the same event identifier as one of the two monitoring events and occurrences of monitoring events that have the same event identifier as the other of the two monitoring events. For example, if a first monitoring event has occurred 100 times, a second monitoring event has occurred 10 times, the first monitoring event has occurred 20 times within a defined time threshold (e.g., within one hour) from an instance of second monitoring event, and the second monitoring event has occurred 8 times within the defined time threshold from an instance of the first monitoring event, then the co-occurrence measure associated with the two monitoring events may be determined based on $(20+8)/(100+10)=0.25$.

In some cases, the threshold time period for different events may be different. For example, if a first monitoring event has occurred 200 times, a second monitoring event has occurred 30 times, the first monitoring event has occurred 10 times within a first defined time threshold (e.g., within one hour) from an instance of second monitoring event, and the second monitoring event has occurred 12 times within a second defined time threshold (e.g., within thirty minutes) from an instance of the first monitoring event, then the co-occurrence measure associated with the two monitoring events may be determined based on $(10+12)/(200+12)=0.10$. As another example, if a first monitoring event has occurred 100 times, a second monitoring event has occurred 10 times, the first monitoring event has occurred 20 times within a first defined time threshold (e.g., within two hours) from an instance of second monitoring event, and the second monitoring event has occurred 5 times within a second defined time threshold (e.g., within twenty minutes) from an instance of the first monitoring event, then the co-occurrence measure associated with the two monitoring events may be determined based on $(20+5)/(100+10)=0.23$.

In some cases, the threshold time period for a monitoring event may be determined based on historical data associated with occurrences of the monitoring event. For example, the XDR system 104 may determine, based on historical data indicating that a first monitoring event is followed by a second monitoring event within a particular time period, that the threshold time period for the first monitoring event includes the particular time period. For example, the XDR system 104 may determine, based on historical data, that a first monitoring event (e.g. a malware infection event) is followed by a second monitoring event (e.g. an unauthorized external connection event) within an average of 30 minutes in 95% of cases. Based on this historical data, the XDR system 104 may use a 35 minute threshold time period when calculating the co-occurrence measure between the malware infection event and the unauthorized connection event.

In some cases, the threshold time period for a monitoring event may be determined based on historical data associated with occurrences of the monitoring event. For example, the XDR system 104 may analyze timestamps of past instances of a particular malware infection event to determine a distribution of time deltas between the malware infection event and subsequent events. If the XDR system 104 determines that a threshold ratio of historical malware infections were followed by communication with an external command and control server within two hours, the XDR system 104 may use a two hour time threshold when calculating co-occurrence measures for that malware infection event.

In some cases, to determine a co-occurrence measure associated with a first monitoring event and a second monitoring event, the co-occurrence model 114: (i) queries first data representing occurrences of the first monitoring event and second data representing occurrences of the second monitoring event, (ii) determines a total number of queried occurrences, (iii) determines whether to include an occurrence of one of the two monitoring events in a selected subset of occurrences if the occurrence occurs within a threshold time period of an occurrence of the other of the two monitoring events, (iv) determines a number of occurrences in the selected subset, and (v) determines the co-occurrence measure based on the total number and the number of occurrences in the selected subset (e.g., based on a ratio of the number of occurrences in the selected subset to the total number of occurrences). In some cases, to determine the first data representing occurrences of a monitoring event, the co-occurrence model 114 (or another component of the XDR system 104, such as the occurrence model 112) queries the event repository 108 based on at least one of an event identifier associated with the monitoring event and an identifier associated with the monitoring event.

In some cases, as part of determining the co-occurrence measure associated with two monitoring events, the occurrence model 112 queries the event repository 108 to retrieve first data representing occurrences of the first monitoring event and second data representing occurrences of the second monitoring event. In some cases, to determine the co-occurrence measure associated with the two monitoring events, the co-occurrence model 114 receives the first and second data from the occurrence model 112 and processes the first and second data to determine the co-occurrence measure. For example, in some cases, the co-occurrence model 114: (i) (determines a total number of queried occurrences based on the first and the second data, (ii) determines, based on the first and the second data, whether to include an occurrence of one of the two monitoring events in a selected subset of occurrences if the occurrence occurs within a threshold time period of an occurrence of the other of the two monitoring events, (iii) determines a number of occurrences in the selected subset, and (iv) determines the co-occurrence measure based on the total number and the number of occurrences in the selected subset (e.g., based on a ratio of the number of occurrences in the selected subset to the total number of occurrences).

In some cases, the co-occurrence measure associated with two monitoring events may be determined based on a total count of occurrences of the two events within a threshold time period. For example, in some cases, to determine the co-occurrence measure associated with two monitoring events, the co-occurrence model 114 determines, based on the first and the second data, whether to include an occurrence of one of the two monitoring events in a selected subset of occurrences if the occurrence occurs within a threshold time period of an occurrence of the other of the two monitoring events. Afterward, the co-occurrence model 114 may determine a number of occurrences in the selected subset and/or adopt the number of occurrences in the selected subset as the co-occurrence measure associated with the two monitoring events.

As further depicted in FIG. 1, the XDR system 104 includes a regularization model 116 that is configured to determine a regularization parameter associated with a first monitoring event and a second monitoring event based on at least one of: (i) an occurrence measure associated with the first monitoring event, (ii) an occurrence measure associated with the second monitoring event, or (iii) a co-occurrence measure associated with the first monitoring event and the second monitoring event. For example, the regularization parameter may be determined based on a summation of: (i) an occurrence measure associated with the first monitoring event, (ii) an occurrence measure associated with the second monitoring event, and (iii) an inverse of a co-occurrence measure associated with the first monitoring event and the second monitoring event. In some cases, the regularization parameter is determined based on the output of the equation $occurrence(Cat_1, K_1) + occurrence(Cat_2, K_2) - Co\text{-}occurrence((Cat_1, K_1), (Cat_2, K_2))$, where: (i) $Cat_1$ and $K_1$ are the event category identifier and the event identifier for the first monitoring event respectively, (ii) $Cat_2$ and $K_2$ are the event category identifier and the event identifier for the second monitoring event respectively, (iii) $occurrence(Cat_1, K_1)$ is the occurrence measure for the first monitoring event (e.g., as determined by querying the event repository 108 based on $Cat_1$ and $K_1$), (iv) $occurrence(Cat_2, K_2)$ is the occurrence measure for the second monitoring event (e.g., as determined by querying the event repository 108 based on $Cat_2$ and $K_2$), and (iv) $Co\text{-}occurrence((Cat_1, K_1), (Cat_2, K_2))$ is the co-occurrence measure associated with the first monitoring event and the second monitoring event.

In some cases, the regularization parameter represents a measure of co-occurrence of two monitoring events as adjusted by the occurrence measures of the two monitoring events. This adjustments may be performed because a more frequently occurring event may co-occur with many different events, but this co-occurrence may be misleading if not normalized based on the occurrence measure of that event. For example, a generic monitoring event like a failed login attempt may happen very frequently across an organization's devices and systems. This highly prevalent event could have many recorded instances of co-occurring with other less common events. Without accounting for the underlying occurrence measure, the co-occurrence measures associated with the failed login event may be misleading. However, by incorporating occurrence probabilities into the regularization parameter calculation, the frequency bias of the failed login event is offset. The resulting parameter thereby provides a more accurate quantification of whether two particular events co-occur at a disproportionately high rate indicative of a relationship beyond coincidence. The parameter enables automatically filtering out expected co-occurrences to avoid false positives while still highlighting truly irregular event pairings warranting further review.

As further depicted in FIG. 1, the XDR system 104 includes a ranking model 118 that is configured to determine a ranking score for a first monitoring event with respect to a second monitoring event based on at least one of: (i) an occurrence measure associated with the first monitoring event, (ii) an occurrence measure associated with the second monitoring event, (iii) a co-occurrence measure associated with the first monitoring event and the second monitoring event, or (iv) a regularization parameter associated with first monitoring event and the second monitoring event. For example, in some cases, the ranking model 118 determines a ranking score for a first monitoring event with respect to a second monitoring event based on (e.g., based on a ratio of) the co-occurrence measure associated with the first monitoring event and the second monitoring event and the regularization parameter associated with the first monitoring event and the second monitoring event.

In some cases, the ranking model 118 determines a ranking score for a first monitoring event with respect to a second monitoring event based on the output of the equation $$\frac{\text{Co-occurrence } ((Cat1, K1), (Cat2, K2))}{\text{occurrence } (Cat1, K1) + \text{occurrence } (Cat2, K2) -} ,$$
$$\text{Co-occurance } ((Cat1, K1), (Cat2, K2))$$

where: (i) $Cat_1$ and $K_1$ are the event category identifier and the event identifier for the first monitoring event respectively, (ii) $Cat_2$ and $K_2$ are the event category identifier and the event identifier for the second monitoring event respectively, (iii) occurrence($Cat_1$, $K_1$) is the occurrence measure for the first monitoring event (e.g., as determined by querying the event repository 108 based on $Cat_1$ and $K_1$), (iv) occurrence($Cat_2$, $K_2$) is the occurrence measure for the second monitoring event (e.g., as determined by querying the event repository 108 based on $Cat_2$ and $K_2$), (iv) Co-occurrence(($Cat_1$, $K_1$), ($Cat_2$, $K_2$)) is the co-occurrence measure associated with the first monitoring event and the second monitoring event, and (iv) occurrence($Cat_1$, $K_1$)+ occurrence($Cat_2$, $K_2$)–Co-occurrence(($Cat_1$, $K_1$), ($Cat_2$, $K_2$)) is the regularization parameter associated with the first monitoring event and the second monitoring event.

In some cases, the occurrence model 112, the co-occurrence model 114, the regularization model 116, and/or the ranking model 118 are part of a ranking layer 124 of the XDR system 104. The ranking layer 124 may be configured to: (i) receive a request for displaying a ranked list of related monitoring events associated with a first monitoring event (e.g., a first monitoring event selected by a user and/or by an automated routine and using the administrator platform 120), (ii) determine a set of related monitoring events associated with the first monitoring event, (iii) determine a set of ranking scores for the set of related monitoring events, and (iv) display at least a subset of the set of related monitoring events based on the determined ranking scores (e.g., using the administrator platform 120).

For example, in some cases, the ranking layer 124 may be configured to: (i) receive a request for displaying a ranked list of related monitoring events associated with a first monitoring event (e.g., a first monitoring event selected by a user and/or by an automated routine and using the administrator platform 120), (ii) determine a set of contextual monitoring events (e.g., a set of monitoring events that occurred within a threshold time period before and/or after the first monitoring event), (iii) for each contextual monitoring event, determine a ranking score (e.g., by using the occurrence model 112, the co-occurrence model 114, the regularization model 116, and/or the ranking model 118), (iv) determine up to S of the contextual monitoring events having the highest ranking scores (e.g., where S may be a tunable hyper-parameter of the ranking layer 124 and/or may be set by configuration data associated with the XDR system 104) and/or (v) display the S monitoring events (e.g., in an order determined based on the determined ranking scores, such as in a descending order of ranking scores).

In some cases, to determine the ranking score of a first monitoring event and a contextual monitoring event, the ranking layer 124 may: (i) identify the contextual monitoring event based at least in part on determining that the contextual monitoring event occurs within a threshold time period before and/or after the occurrence of the first monitoring event, (ii) query the event repository 108 based on at least one of an event identifier associated with the first monitoring event or an identifier of the first event's category, (iii) determine an occurrence model for the first monitoring event using the query data generated at (ii) and/or using the occurrence model 112, (iv) query the event repository 108 based on at least one of an event identifier associated with the contextual monitoring event or an identifier of the contextual event's category, (v) determine an occurrence model for the contextual monitoring event using the query data generated at (iv) and/or using the occurrence model 112, (vi) determine a co-occurrence model associated with the first monitoring event and the contextual monitoring event using the co-occurrence model 114, (vii) determine a regularization parameter for the first monitoring event and the contextual monitoring event using the regularization model 116, and/or (viii) determine a ranking score for the first monitoring event and the contextual monitoring event using the ranking model 118.

For example, consider a monitoring event that relates to detection of a particular fishing action with respect to a particular file. In this example, the ranking layer 124 may receive a request to display related events for this phishing detection event. The ranking layer 124 may then identify other events that occurred within a defined time window of the phishing event, such as within one hour before or after the phishing event. Such events can include a malware infection event on the same endpoint, a suspicious inbound email event, an unauthorized external network connection event, a privileged account login event, and/or a second phishing detection event on another endpoint. For each contextual event, the ranking layer 124 may determine an occurrence measure. The ranking layer 124 may also determine co-occurrence measures between the phishing event and each contextual event. Next, the ranking layer 124 may determine regularization parameters for the contextual events using the occurrence and co-occurrence measures. Finally, the ranking layer 124 may determine ranking scores for the contextual events based on the co-occurrence measures and regularization parameters. The top S (e.g., three) contextual events by ranking score may then be selected and displayed to an administrator user in descending order.

In some cases, the ranking layer 124 may determine a ranking score for two monitoring events by processing the occurrence likelihoods and/or the co-occurrence likelihood associated with the two monitoring events using a trained machine learning model. In some cases, if a user removes a monitoring event determined to be related to another event based on the ranking score for the two events, the system uses this removal as training data used to retrain the machine learning model.

As further depicted in FIG. 1, the XDR system 104 includes an administrator platform 120 that is configured to depict configuration data associated with a monitored computer system, such as a ranked list of related monitoring events associated with a selected monitoring event. In some cases, the administrator platform 120 may be a user interface platform that enables a user (e.g., an administrator user) to view and/or interact with various data models and metrics provided by the XDR system 104. For example, the administrator platform 120 may display an interactive user interface that depicts monitoring data, such as aggregated monitoring events, monitoring event occurrence measures, co-occurrence measures, regularization parameters, risk scores, and/or ranked lists of related events for a selected event. In some cases, using the administrator platform 120, a user can visualize and navigate security event data flows to gain insights into emerging threats and guide incident response. For example, upon selecting a suspicious monitoring event such as a detected malware infection, the administrator platform 120 may display a ranked list of related contextual events (e.g., unauthorized network connection events, suspicious login events, and/or the like) as determined by the ranking model 118. The administrator platform 120 may order related events by ranking score so that more statistically relevant events are at the top of the list. In some cases, the administrator platform 120 may display metrics like occurrence measures and/or co-occurrence measures associated with a selected monitoring event.

As further depicted in FIG. 1, the XDR system 104 includes a diagnostic layer 122 that may perform one or more diagnostic operations (e.g., one or more automated diagnostic operations) based on the ranked list of related events associated with a monitoring event. For example, the diagnostic layer 122 may automatically initiate and/or execute diagnostic processes and/or responsive processes based on highly ranked related events. In some cases, certain pairings of monitoring event and related events may have predefined diagnostic workflows for containment and/or repair. For example, if a malware infection event is deemed to be significantly related to an unexpected network traffic event, the diagnostic layer 122 may automatically isolate hosts associated with traffic, suspend user accounts associated with the traffic, block risky incoming traffic, and/or store forensic data associated with suspicious traffic.

In some cases, after the diagnostic layer 122 performs one or more diagnostic operations, the diagnostic layer 122 may perform one or more responsive actions and/or one or more corrective actions based on the output of the diagnostic operation(s). Examples of responsive and/or corrective actions include at least one of isolating a compromised device based on an IP address associated with a security threat, blocking network communication(s) associated with a detected threat, quarantining data implicated in malicious event(s), adjusting firewall policies in response to one or more access patterns associated with one or more detected security threats, or prompting administrative investigation of user accounts associated with one or more detected security threats.

Figure 2:
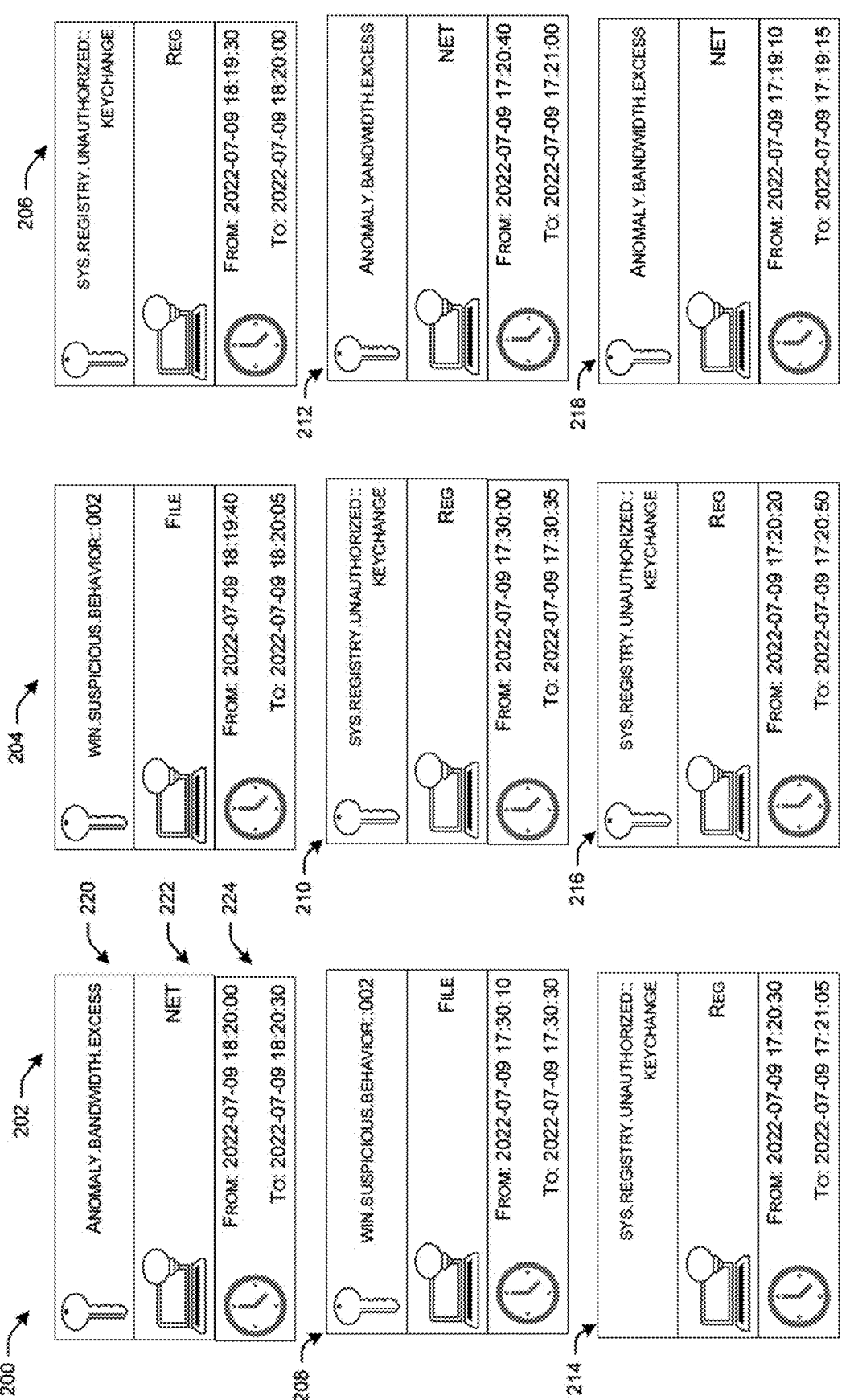
FIG. 2 provides an operational example of an event repository with a set of monitoring events.

FIG. 2 provides an operational example of an event repository 200 with a set of monitoring events. As depicted in FIG. 2, the event repository 200 includes nine monitoring events; specifically, monitoring event 202, monitoring event 204, monitoring event 206, monitoring event 208, monitoring event 210, monitoring event 212, monitoring event 214, monitoring event 216, and monitoring event 218. As further depicted in FIG. 2, each monitoring event is associated with an event identifier, an event category identifier, and a set of timestamps that define an occurrence time associated with the monitoring event. For example, the monitoring event is associated with the event identifier 220 (i.e., Anamoly.Bandwidth.Excess), event category identifier 222 (i.e., Net) and the timestamps 224 (i.e., from 2022-07-09 18:20:00 to 2022-07-09 18:20:30).

In some cases, the event identifier and/or the event category identifier associated with a monitoring event may be used to query the events associated with the event identifier and/or the event category identifier. For example, querying the event repository 200 based on the event identifier 220 and/or event category identifier 222 may return the monitoring event 202, the monitoring event 212, and the monitoring event 218. As another example, querying the event repository 200 based on the event identifier Sys.Registry.Unauthorized::Keychange and/or the event category Reg may return the monitoring event 206, the monitoring event 210, the monitoring event 214, and the monitoring event 216. In some cases, the timestamps associated with two monitoring events may be used to determine whether the two monitoring events occur within a threshold time period of another. Such threshold time correlation analyses may be used to determine co-occurrence measures associated with the two monitoring events.

FIG. 3 provides an operational example of an administrator platform 300 that depicts a ranked list of monitoring events associated with a target monitoring event 312. As depicted in FIG. 3, the administrator platform 300 depicts, for each monitoring event that is determined to be related to the target monitoring event 312, an event description using the column 302, an event count using the column 304, an event initiation timestamp using the column 306, an event termination timestamp using the column 308, and a ranking score using the column 310.

The event description associated with an event may include at least one of an event identifier associated with the event or the event category identifier associated with the event. For example, the event description associated with the event corresponding to the first non-header row is FILE: Win.Trojan.Generic::100 Sbx.Vioc, which includes the event category identifier FILE and the event identifier Win.Trojan.Generic::100 Sbx.Vioc.

The event count associated with an event may indicate a number of times data corresponding to a monitoring event was recorded during a time period in which such data was continuously and/or contiguously observed. In some cases, monitoring events having the same event identifier and/or the same event category are grouped together if they occur within a threshold time period (e.g., within one minute). For example, the event count associated with the event corresponding to the first non-header row indicates that the corresponding event was recorded once between 2022-07-09 18:47:02 and 2022-07-09 18:47:02.

The event initiation timestamp and the event termination timestamp may indicate a period of time in which the data corresponding to an event was received and/or generated. The event initiation timestamp and the event termination timestamp may indicate a period of time in which the corresponding event was observed. For example, the event initiation timestamp and the event termination timestamp associated with the event corresponding to the first non-header row indicate that the event occurred at 2022-07-09 18:47:02 and terminated at 2022-07-09 18:47:02, indicating that the event was observed as a single occurrence (e.g., rather than as a sequence of occurrences) at the specified time period.

The ranking score may indicate a score determined for an associated with monitoring event with respect to a selected event, for example as determined based on the occurrence measure for the associated event, the occurrence measure for the selected event, the co-occurrence measure for the associated event and the selected event, and/or a regularization parameter for the associated event and the selected event. In some cases, the ranking score(s) associated with the depicted monitoring event(s) may be determined using the techniques described above, for example the techniques described in relation to the ranking model 118. In some cases, the depicted monitoring events are ranked based on the ranking scores, for example in descending order of ranking scores.

Figure 4:
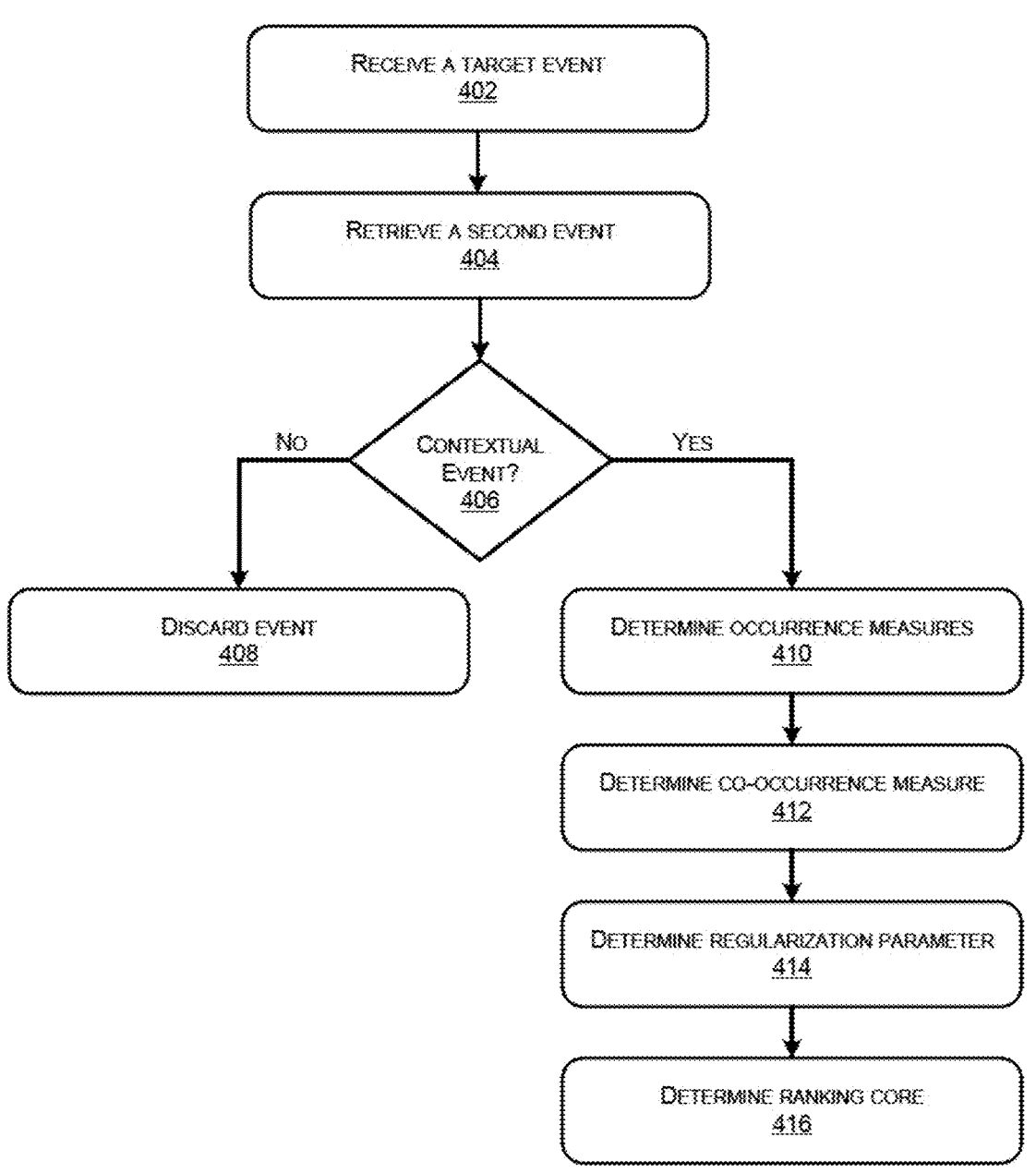
FIG. 4 is a flowchart diagram of an example process for conditionally determining a ranking score for two monitoring events.

FIG. 4 is a flowchart diagram of an example process 400 for conditionally determining a ranking score for two monitoring events. As depicted in FIG. 4, at operation 402, an example system receives a target monitoring event. The target monitoring event may, for example, be selected by a user (e.g., an administrator user) and/or an automated routine using the administrator platform 120. The administrator platform 120 may include at least one of a user interface platform and/or an application programming interface.

At operation 404, the system receives a second monitoring event. The second monitoring event may, for example, be a monitoring event randomly retrieved from the repository. The second monitoring event may, for example, be a monitoring event that is associated with the same event category as the target monitoring event.

At operation 406, the system determines whether the target monitoring event and the second monitoring event have occurred within a threshold period. If the system determines that the two monitoring events have not occurred within a threshold period (operation 406—No), the system proceeds to operation 408 to not determine a ranking score for the two monitoring events. However, if the system determines that the two monitoring events have not occurred within a threshold period (operation 406—Yes), the system proceeds to operation 410 to determine a set of occurrence measures. The set of occurrence measures may include an occurrence measure associated with the target monitoring event and an occurrence measure associated with the second monitoring event.

At operation 412, the system determines a co-occurrence measure associated with the target monitoring event and the second monitoring event. The co-occurrence measure may be a measure of occurrence of the two events within temporal proximities of one another, for example as indicated by historical occurrence data associated with the two events.

At operation 414, the system determines a regularization parameter associated with the target monitoring event and the second monitoring event. For example, the system may determine the regularization parameter based on a summation of: (i) the occurrence measure associated with the target event, (ii) the occurrence measure associated with the second event, and (iii) data determined based on (e.g., an inverse) of the co-occurrence measure associated with the target monitoring event and the second monitoring event.

At operation 416, the system determines a ranking score associated with the target monitoring event and the second monitoring event. For example, in some cases, the system determines a ranking score for the two monitoring events based on (e.g., based on a ratio of) the co-occurrence measure associated with the two monitoring events and the regularization parameter associated with the two monitoring events. The ranking score may be used to determine whether to display the second event in relation to the target event and/or the order in which the second event is displayed in relation to the target event.

FIG. 5 is a flowchart diagram of an example process 500 for conditionally displaying a contextual monitoring event in relation to a selected monitoring event. At operation 502, an example system identifies the contextual event. The contextual event may, for example, be a monitoring event that occurs within a threshold time period of the selected event.

At operation 504, the system determines a ranking score associated with the two monitoring events. In some cases, the system determines a ranking score for the two monitoring events based on (e.g., based on a ratio of) the co-occurrence measure associated with the two monitoring events and the regularization parameter associated with the two monitoring events.

At operation 506, the system determines whether the ranking score exceeds a threshold. The threshold ranking score may be determined based on a preconfigured value. In some cases, the threshold ranking score is dynamically determined at runtime. For example, the threshold ranking score may be determined based on a value that falls below the top S ranking scores associated with a set of contextual monitoring events (e.g., a set of contextual monitoring events that have occurred within a threshold period of the selected event). S may be determined based on a tunable hyper-parameter, based on a user input (e.g., an administrator input), based on an available computational capacity and/or display capacity, and/or the like.

If the system determines that the ranking score does not exceed the threshold (operation 506—No), the system proceeds to operation 508 to refrain from displaying the contextual event. However, if the system determines that the ranking score exceeds the threshold (operation 506—Yes), the system proceeds to operation 510 to display the contextual event based on the ranking score. For example, the system may display a set of contextual events whose ranking scores exceed the ranking score threshold based on an order determined based on their respective ranking scores (e.g., in a descending order of ranking scores).

Figure 6:
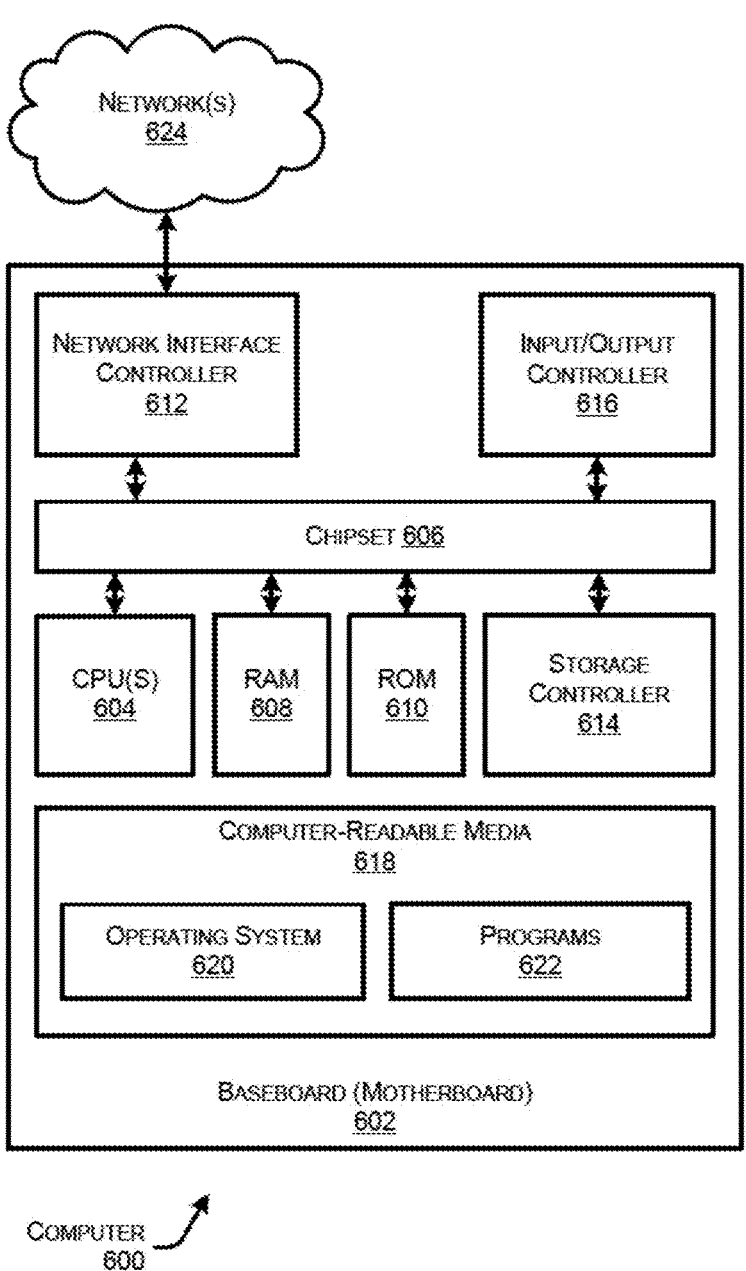
FIG. 6 shows an example computer architecture for a computing device capable of executing program components for implementing the functionality described above.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network 624. The chipset 606 can include functionality for providing network connectivity through a NIC 612, such as a gigabit Ethernet adapter. The NIC 612 is capable of connecting the computing device 600 to other computing devices over the network. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by a network, and/or any components included therein (e.g., a router, such as an edge router), may be supported by one or more devices similar to computing device 600. Stated otherwise, some or all of the operations performed by the network, and or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

The computing device 600 may support a virtualization layer, such as one or more components associated with a computing resource network. The virtualization layer may provide virtual machines or containers that abstract the underlying hardware resources and enable multiple operating systems or applications to run simultaneously on the same physical machine. The virtualization layer may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 600 may also support other software layers, such as middleware, application frameworks, or databases, that provide additional abstraction and services to application developers and users. In some cases, the computing device 600 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, by a processor, a first monitoring event associated with a security incident recorded in relation to a computer system, wherein the first monitoring event is associated with a first event category and a first feature value corresponding to a first feature type;

receiving, by the processor, a second monitoring event associated with the computer system, wherein the second monitoring event is associated with a second event category and a second feature value corresponding to a second feature type;

determining first data representing that the first event category is indexed based at least in part on the first feature type on an event repository;

determining second data representing that the second event category is indexed based at least in part on the second feature type on the event repository;

determining, by the processor and based on the first data, a first identifier associated with the first monitoring event based on the first feature value;

determining, by the processor and based on the second data, a second identifier associated with the second monitoring event based on the second feature value;

querying, by the processor, the event repository based on the first identifier and a third identifier associated with the first event category to determine a first query output;

determining, by the processor and based on the first query output, a first occurrence measure associated with the first monitoring event;

querying, by the processor, the event repository based on the second identifier and a fourth identifier associated with the second event category to determine a second query output;

determining, by the processor and based on the second query output, a second occurrence measure associated with the second monitoring event;

determining, by the processor, a co-occurrence measure associated with the first monitoring event and the second monitoring event;

determining, by the processor, a ranking score associated with the second monitoring event based on the first occurrence measure, the second occurrence measure, and the co-occurrence measure, wherein determining the co-occurrence measure comprises:

determining, by querying the event repository based on the first identifier, a first set of occurrences of the first monitoring event, determining, by querying the event repository based on the second identifier, a second set of occurrences of the second monitoring event, determining, based on a first timestamp associated with a first occurrence in the first set of occurrences and a second timestamp associated with a second occurrence in the second set of occurrences, first data representing that the second occurrence has occurred within a first threshold period of the first occurrence, determining, based on a third timestamp associated with a third occurrence in the first set of occurrences and a fourth timestamp associated with a fourth occurrence in the second set of occurrences, second data representing that the third occurrence has occurred within a second threshold period of the fourth occurrence, and determining the co-occurrence measure based on the first data and the second data; and based on determining that the ranking score satisfies a threshold, causing, by the processor, a representation of the second monitoring event to be displayed using a system administrator platform associated with the computer system.

2. The method of claim 1, wherein the first event category is associated with a first event monitoring component and the second event category is associated with a second event monitoring component.

3. The method of claim 1, wherein determining the ranking score comprises:

determining a regularization parameter based on the first occurrence measure and the second occurrence measure, wherein the regularization parameter represents a combined occurrence frequency associated with the first monitoring event and the second monitoring event; and determining the ranking score based on a transformation of the co-occurrence measure based on the regularization parameter.

4. The method of claim 3, wherein the regularization parameter is determined based on the first occurrence measure, the second occurrence measure, and the co-occurrence measure.

5. The method of claim 3, wherein determining the regularization parameter comprises:

querying the event repository based on the third identifier to determine a third occurrence measure associated with the first event category;

querying the event repository based on the fourth identifier to determine a fourth occurrence measure associated with the second event category; and determining the regularization parameter based on the first occurrence measure, the second occurrence measure, the third occurrence measure, and the fourth occurrence measure.

6. The method of claim 1, wherein determining the ranking score comprises:

determining the ranking score based on a machine learning model, wherein input data to the machine learning model comprises the first occurrence measure, the second occurrence measure, and the co-occurrence measure.

7. The method of claim 6, further comprising:

receiving, by the processor, an indication of removal of the second monitoring event from a list displayed using the system administrator platform; and based on receiving the indication, retraining the machine learning model.

8. The method of claim 1, wherein the first monitoring event is selected by a user of the system administrator platform.

9. The method of claim 1, wherein:

events associated with the first event category are indexed based on a first set of feature types, and events associated with the second event category are indexed based on a second set of feature types, wherein the first set of feature types are different from the second set of feature types.

10. A system comprising:

one or more processors; and one or more computer-readable media storing computer-executable instructions that, when executed by the one or more processors, cause the one or more processors to perform operations comprising:

receiving a first monitoring event associated with a security incident recorded in relation to a computer system, wherein the first monitoring event is associated with a first event category and a first feature value corresponding to a first feature type;

receiving a second monitoring event associated with the computer system, wherein the second monitoring event is associated with a second event category and a second feature value corresponding to a second feature type;

determining first data representing that the first event category is indexed based at least in part on the first feature type on an event repository;

determining second data representing that the second event category is indexed based at least in part on the second feature type on the event repository;

determining, based on the first data, a first identifier associated with the first monitoring event based on the first feature value;

determining, based on the second data, a second identifier associated with the second monitoring event based on the second feature value;

querying the event repository based on the first identifier and a third identifier associated with the first event category to determine a first query output;

determining, based on the first query output, a first occurrence measure associated with the first monitoring event;

querying the event repository based on the second identifier and a fourth identifier associated with the second event category to determine a second query output;

determining, based on the second query output, a second occurrence measure associated with the second monitoring event;

determining a co-occurrence measure associated with the first monitoring event and the second monitoring event, wherein determining the co-occurrence measure comprises:

determining, by querying the event repository based on the first identifier, a first set of occurrences of the first monitoring event, determining, by querying the event repository based on the second identifier, a second set of occurrences of the second monitoring event, determining, based on a first timestamp associated with a first occurrence in the first set of occurrences and a second timestamp associated with a second occurrence in the second set of occurrences, first data representing that the second occurrence has occurred within a first threshold period of the first occurrence, determining, based on a third timestamp associated with a third occurrence in the first set of occurrences and a fourth timestamp associated with a fourth occurrence in the second set of occurrences, second data representing that the third occurrence has occurred within a second threshold period of the fourth occurrence, and determining the co-occurrence measure based on the first data and the second data;

determining a ranking score associated with the second monitoring event based on the first occurrence measure, the second occurrence measure, and the co-occurrence measure; and based on determining that the ranking score satisfies a threshold, causing a representation of the second monitoring event to be displayed using a system administrator platform associated with the computer system.

11. The system of claim 10, wherein determining the ranking score comprises:

determining a regularization parameter based on the first occurrence measure and the second occurrence measure, wherein the regularization parameter represents a combined occurrence frequency associated with the first monitoring event and the second monitoring event; and determining the ranking score based on a transformation of the co-occurrence measure based on the regularization parameter.

12. The system of claim 11, wherein the regularization parameter is determined based on the first occurrence measure, the second occurrence measure, and the co-occurrence measure.

13. The system of claim 11, wherein determining the regularization parameter comprises:

querying the event repository based on the third identifier to determine a third occurrence measure associated with the first event category;

querying the event repository based on the fourth identifier to determine a fourth occurrence measure associated with the second event category; and determining the regularization parameter based on the first occurrence measure, the second occurrence measure, the third occurrence measure, and the fourth occurrence measure.

14. The system of claim 10, wherein determining the ranking score comprises:

determining the ranking score based on a machine learning model, wherein input data to the machine learning model comprises the first occurrence measure, the second occurrence measure, and the co-occurrence measure.

15. The system of claim 14, the operations further comprising:

receiving an indication of removal of the second monitoring event from a list displayed using the system administrator platform; and based on receiving the indication, retraining the machine learning model.

16. The system of claim 10, wherein the first monitoring event is selected by a user of the system administrator platform.

17. One or more non-transitory computer-readable media storing computer-executable instructions that, when executed by one or more processors, cause the one or more processors to perform operations comprising:

receiving a first monitoring event associated with a security incident recorded in relation to a computer system, wherein the first monitoring event is associated with a first event category and a first feature value corresponding to a first feature type;

receiving a second monitoring event associated with the computer system, wherein the second monitoring event is associated with a second event category and a second feature value corresponding to a second feature type;

determining first data representing that the first event category is indexed based at least in part on the first feature type on an event repository;

determining second data representing that the second event category is indexed based at least in part on the second feature type on the event repository;

determining, based on the first data, a first identifier associated with the first monitoring event based on the first feature value;

determining, based on the second data, a second identifier associated with the second monitoring event based on the second feature value;

querying the event repository based on the first identifier and a third identifier associated with the first event category to determine a first query output;

determining, based on the first query output, a first occurrence measure associated with the first monitoring event;

querying the event repository based on the second identifier and a fourth identifier associated with the second event category to determine a second query output;

determining, based on the second query output, a second occurrence measure associated with the second monitoring event;

determining a co-occurrence measure associated with the first monitoring event and the second monitoring event, wherein determining the co-occurrence measure comprises:

determining, by querying the event repository based on the first identifier, a first set of occurrences of the first monitoring event, determining, by querying the event repository based on the second identifier, a second set of occurrences of the second monitoring event, determining, based on a first timestamp associated with a first occurrence in the first set of occurrences and a second timestamp associated with a second occurrence in the second set of occurrences, first data representing that the second occurrence has occurred within a first threshold period of the first occurrence, determining, based on a third timestamp associated with a third occurrence in the first set of occurrences and a fourth timestamp associated with a fourth occurrence in the second set of occurrences, second data representing that the third occurrence has occurred within a second threshold period of the fourth occurrence, and determining the co-occurrence measure based on the first data and the second data;

determining a ranking score associated with the second monitoring event based on the first occurrence measure, the second occurrence measure, and the co-occurrence measure; and based on determining that the ranking score satisfies a threshold, causing a representation of the second monitoring event to be displayed using a system administrator platform associated with the computer system.

18. The one or more non-transitory computer-readable media of claim 17, wherein determining the ranking score comprises:

determining a regularization parameter based on the first occurrence measure and the second occurrence measure, wherein the regularization parameter represents a combined occurrence frequency associated with the first monitoring event and the second monitoring event; and determining the ranking score based on a transformation of the co-occurrence measure based on the regularization parameter.

19. The one or more non-transitory computer-readable media of claim 18, wherein the regularization parameter is determined based on the first occurrence measure, the second occurrence measure, and the co-occurrence measure.

* * * * *